United States Patent
Lafeir

(10) Patent No.: US 10,963,967 B1
(45) Date of Patent: Mar. 30, 2021

(54) SYSTEM AND METHOD UTILIZING STEERING WHEEL SENSORS FOR DETERMINING DRIVER BEHAVIOR

(71) Applicant: United Services Automobile Association ("USAA"), San Antonio, TX (US)

(72) Inventor: Ann Lafeir, Boerne, TX (US)

(73) Assignee: United Services Automobile Association ("USAA"), San Antonio, TX (US)

(*) Notice: Subject to any disclaimer, the term of this patent is extended or adjusted under 35 U.S.C. 154(b) by 492 days.

(21) Appl. No.: 15/169,173

(22) Filed: May 31, 2016

Related U.S. Application Data

(60) Provisional application No. 62/167,777, filed on May 28, 2015.

(51) Int. Cl.
*G06Q 40/08* (2012.01)
*B60Q 9/00* (2006.01)

(52) U.S. Cl.
CPC ............. *G06Q 40/08* (2013.01); *B60Q 9/00* (2013.01)

(58) Field of Classification Search
CPC ..................................................... G06Q 40/08
See application file for complete search history.

(56) References Cited

U.S. PATENT DOCUMENTS

| | | | | |
|---|---|---|---|---|
| 2011/0133919 A1* | 6/2011 | Evarts | ............... | B60Q 9/00 340/439 |
| 2011/0284304 A1* | 11/2011 | Van Schoiack | ....... | B60W 40/08 180/272 |
| 2012/0109418 A1* | 5/2012 | Lorber | ............... | G06Q 10/00 701/1 |
| 2013/0144657 A1* | 6/2013 | Ricci | ............... | H04W 4/90 705/4 |
| 2014/0172467 A1* | 6/2014 | He | ............... | B60K 28/066 705/4 |
| 2015/0203063 A1* | 7/2015 | Koehler | ............... | B60R 21/00 701/36 |

FOREIGN PATENT DOCUMENTS

CN        102897089 A  *  1/2013

\* cited by examiner

*Primary Examiner* — Arunava Chakravarti
(74) *Attorney, Agent, or Firm* — Locke Lord LLP; Christopher J. Capelli

(57) ABSTRACT

A computer system and method for associating hand placement on a vehicle steering wheel with a driving behavior is described. A sensor system is disposed on the steering wheel configured to detect contact of driver hands upon the steering wheel. A computer processor is coupled to the sensor system to receive and analyze data indicative of hand placement on the steering wheel to determine hand placement. A transceiver device communicates with the computer processor whereby data indicative of hand placement is transmitted to a computer server device associated with an insurance company providing insurance for the vehicle.

14 Claims, 2 Drawing Sheets

SYSTEM AND METHOD UTILIZING STEERING WHEEL SENSORS FOR DETERMINING DRIVER BEHAVIOR

CROSS REFERENCE TO RELATED APPLICATIONS

This application claims priority to U.S. Patent Application Ser. No. 62/167,777 filed May 28, 2015 which is incorporated herein by reference in its entirety.

FIELD OF THE INVENTION

The disclosed embodiments generally relates to driver safety monitoring and more specifically it relates to a steering wheel hand position system for sensing and monitoring the driver's hand location on the steering wheel for providing feedback regarding driver behavior.

BACKGROUND OF THE INVENTION

Distracted driving and automobile accidents are significant causes of fatalities and injuries. Causes of distracted driving include, but are not limited to, the use of cell phone and other electronic devices while driving such as text message devices, smart phones, even entertainment devices like mp3 players. While drivers are trained to maintain proper hand position on the steering wheel while driving, often hand position is neglected resulting in diminished dexterity while driving, and allowing for use of distracting devices by one or both hands. Additionally neglected is how hand position, or lack thereof, affects it and can be used to customize products and services.

Young drivers may be especially sensitive cases, where suitable parental intervention may help establish long term habits before bad habits are established. In unsupervised positions, it is not possible for a parent or adult to know if unsafe driving behavior is being undertaken.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method for measuring and gathering data associated with hand placement on a vehicle steering wheel and utilizing the data when determining an overall driving behavior is described in which a sensor system is disposed on the steering wheel configured to detect contact of at least one driver hands upon a steering wheel. A computer processor is coupled to the sensor system to receive and analyze data indicative of hand placement on the steering wheel to determine actual hand placement. A transceiver device communicates with the computer processor whereby data indicative of hand placement is transmitted to a computer server device. In an illustrated embodiment, the computer server device is associated with an insurance company providing insurance for the vehicle. The insurance company preferably captures received instances of determined improper hand placement on the steering wheel of the vehicle to determine driver behavior for the vehicle. The insurance company may provide notice of determined improper (or proper) driver behavior to a designated recipient and/or may initiate alterations to an insurance policy, including issuance of a new policy for the vehicle contingent upon determined improper (or proper) driver behavior for the vehicle.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
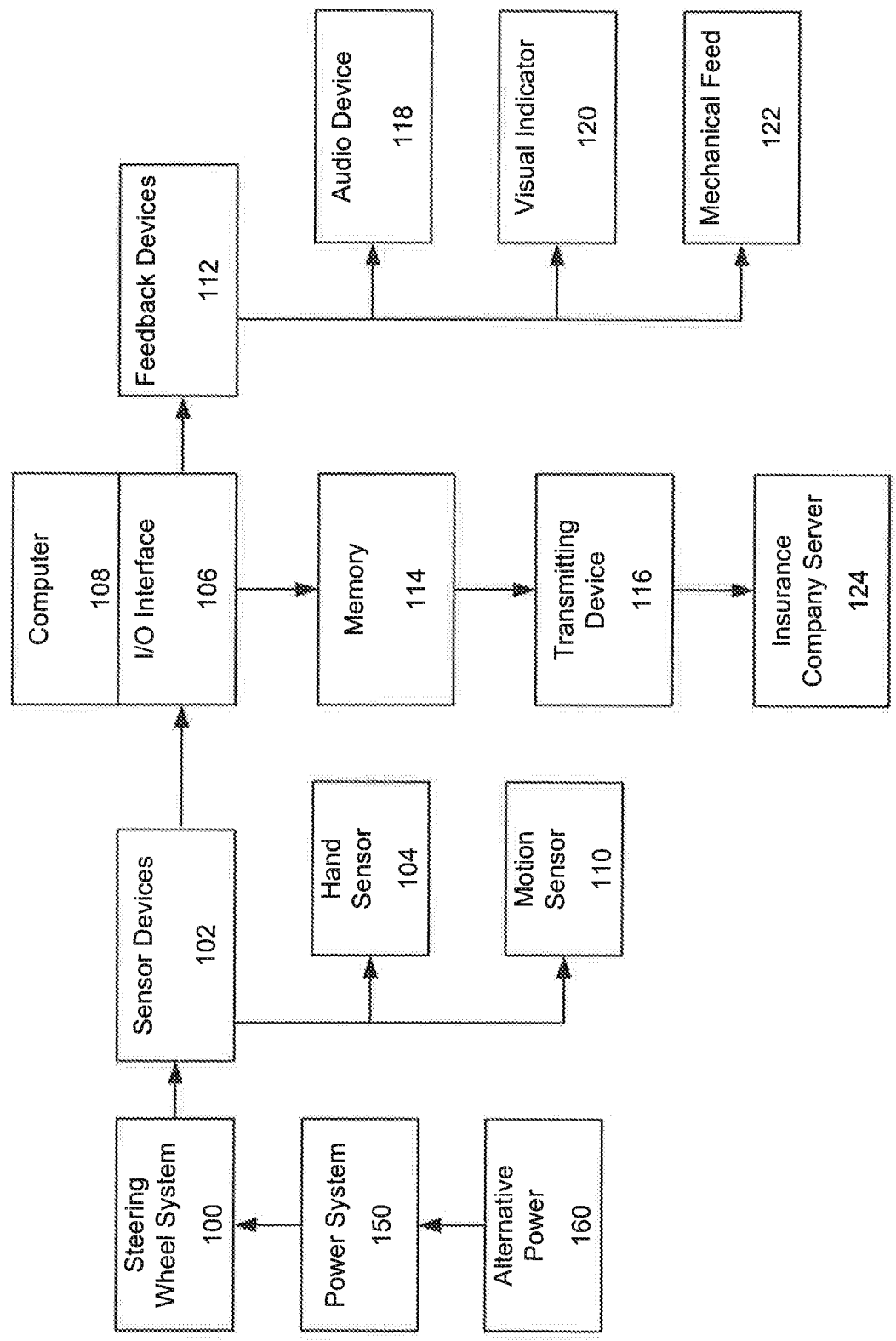
FIG. 1 illustrates a block diagram of a system for monitoring driver hand position on a steering wheel in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, the figures illustrate a sensor array, a computer or controller device, data logging system, feedback devices and a steering wheel mounting system. It is to be understood a steering wheel as referenced and used herein is intended to be a device used to guide/steer a vehicle by hand manipulation and is not limited to round/circular configurations but may encompass any configuration/shape employed in various ground vehicles, maritime craft or aircraft.

Starting at FIG. 1, in accordance with an illustrated embodiment, shown is a steering wheel system 100, which as described below, preferably consists of at least one sensor device 102, which may be touch, pressure, infrared, motion, moisture, magnetic, or others, in linear, web or other configuration that is preferably integrated within a vehicle (e.g., a steering wheel component/system) to detect the presence and location of the driver's hands upon a steering wheel. A vehicle is to be understood to encompass any type of vehicle requiring a steering wheel mechanism for navigation thereof, including an automobile, truck, boat, motorcycle, plane, etc.

In an illustrated embodiment, one or more strategically placed hand sensors 104 are preferably located around a portion (or the entity) of the circumference or perimeter of a steering wheel. These hand position location sensors 104 are operational and configured to detect the presence or absence of hand placement and location on a steering wheel. The sensor connections preferably route to an I/O interface 106 integrated directly with a computer device 108. In addition to hand positions sensors 104, a vehicle motion sensor 110 may be provided configured and operational to detect whether a vehicle is at rest or moving.

It is to be appreciated the hand position sensors 104 used can be any type of sensor device including but not limited to touch, pressure, infrared or mechanical used in any quantity or combination or placement. For instance, the hand sensors 104 may consist of at least two sensor devices disposed on the circumference of the steering wheel or alternatively may consist of a sensor device having an elongated structure (e.g., a ribbon element) disposed along a portion of (or the entirety of) the circumference of the steering wheel.

The vehicle motion sensor 110 can be, but is not limited to, inertia sensor, accelerometer, GPS receiver or other motion detecting device internal or external hard-wired or wireless. Sensor devices 102 are preferably connected to the I/O interface 106 wirelessly, by wired conductive material, or in combination. Wireless transmission may be achieved through a variety of protocols and systems, including but not limited to Bluetooth. Sensor devices 102 may utilize digital, analog or other technologies. Hand position sensors 104 may be arranged in the optimal number and circumferential location as warranted by design parameters and custom configurations.

The computer controller device 108, of one illustrated embodiment, is preferably a programmable computing device that receives information from the sensor array and other system elements and initiates pre-programmed responses. The computer or controller 108 is preferably a programmable system that consists of a central processing unit, data storage capability, input/output controls, and integrated software and firmware one skilled in the art would recognize as being associated with a computing device.

The I/O interface 106 communicates with sensing devices 102 and internal and/or external feedback devices 112. Feedback devices 112 may include light displays identifying appropriate hand positions, zones where unsafe hand positions would occur, or other visual indicia of appropriate hand placement. Such visual displays may be adjusted in intensity by one or more ambient sensors disposed in the vehicle cabin. Software algorithms executing in computing device 108 preferably measure and control the performance of the feedback devices 112. This software preferably controls the basic function and operation of the entire system of sensor devices 102, interfaces, and feedback devices 112. It is to be appreciated feedback devices 112 may encompass applications (apps) executing on a portable computing device (e.g., a tablet or smart phone device) preferably coupled via a network (e.g., Wi-Fi, Bluetooth, NFC, LAN, WAN, and the like) to the computing device 108.

A software algorithm executed in accord with an illustrated embodiment of the present invention is described as follows: the computer 108 is programmable to allow for modification of software and firmware as needed to enhance the system's performance, capabilities and features. The computer is coupled to a memory storage device 114 which preferably uses volatile and/or non-volatile memory components. It receives data from the feedback devices 112 and the sensor devices 102 through the I/O interface 106 and records incidents and changes to system status.

A transmitting device 116 is provided which is preferably configured and operational to use data from the feedback devices 112 to determine if alerts will be communicated to authorized system administrator(s) to send real-time information to third parties ("recipients") (e.g. the vehicle owner, parent of vehicle driver, employer of vehicle driver, the vehicles insurance company, or other designated interested entities).

The controller or computer 108 communicates with the feedback devices 112 and the sensor devices 102 through the I/O interface 106 via either wired or wireless communications through various transmitters/receivers 116. For example, infrared or radio waves (but not limited to these technologies). The I/O interface 106 can communicate with the car's onboard computer or any other vehicle systems or networks. The transmitters/receivers 116 may encompass various such devices, including, but not limited to smart phones devices, OBD devices and the like.

In one embodiment of the present invention, feedback devices 112 receive signals from the computer 108 and provides audio, visual, noise cancelling, mechanical, and/or other signals to the driver to direct appropriate hand position on the steering wheel. In one embodiment, the feedback devices may be integrated into the vehicle's electronic system to allow override of the vehicle's radio and other systems if necessary. This may require proximity to the vehicle's buss or connection to the buss, while other embodiments may allow feedback devices 112 to be disposed in the wheel itself or in its cover element.

The system 100, according to one embodiment, utilizes various feedback devices 112 for multiple constituents. The audio output device 118 preferably consists of a speaker or other device that emits an audible signal. This is a predefined, temporary auditory signal preferably indicating the driver is not following the authorized hand positions on the steering wheel (e.g., both hands on the steering wheel and spaced properly apart from one another). The sound, volume, duration and frequency of the auditory signal is controlled by the software algorithm executing on the computer 108.

A visual indicator 120 may be provided having a light, display, or other device that is integrated or external of a steering wheel, and configured to emit light in the visible range. In one embodiment a series of LED lights may be embedded in the steering wheel configured to create a pre-defined temporary visual display indicating the driver is not following the prescribed hand positions, while in others positive reinforcement may be provided by means of color indicating correct hand placement. The brightness, color and duration of the visual display are preferably controlled by a software algorithm executing on the computer 108.

A mechanical feedback device 122, according to one embodiment, provides a mechanism generating a physical vibration otherwise physically alerting the driver that an inappropriate hand position is being used, including transducers, piezoelectric devices or other devices that transmit mechanical vibration to the operator or occupants of the vehicle. It creates a pre-defined temporary sensation indicating the driver is not following the prescribed hand position on the steering wheel. The intensity, vibration, frequency and timing of the mechanical feedback devices 112 is controlled by the software algorithm executing on the computer 108.

The feedback devices' 112 communications can be transmitted either wirelessly or wired, to integrated or external devices. Authorized personnel are allowed to upload and/or download customized audio tones, custom pre-recorded messages, and visual displays.

The visual indicator 120 can use visual and/or auditory displays such as LEDs, incandescent lights, other visual displays such as HUDs (Heads-up Displays), and/or audio tones.

An ignition suppression system may be provided which is dependent upon electrical signals, or mechanical devices to prevent starting of the vehicle. Such a system would prevent the ignition of the engine when the vehicle did not detect a predefined hand position on a steering wheel so as to prevent vehicle travel. Similarly, vehicle movement could be prevented by other overrides, including transmission. So as to avoid sudden and dangerous overrides, such an ignition suppression system would, in one embodiment, only be activated if the vehicle's transmission was in the park position.

It is to be appreciated that systems configured in accord with one embodiment of the present invention may utilize any number and/or combination of the feedback devices 112 identified herein. While in some embodiments, the system 100 may be integral to a steering wheel of a vehicle, either installed as original equipment or retrofit post-production. In one embodiment of the present invention, the steering wheel mounting system 100 is provided allowing for the installation of a system configured according to one embodiment of the present invention without replacement of the steering wheel. Such a mounting system 100 is preferably a support structure that may be a retrofitted or integrated system that attaches the sensor devices 102 and/or other elements to an existing steering wheel.

It is to be understood the steering wheel mounting system 100 is the support structure of one embodiment of the present invention. It provides the mechanism to integrate the sensor devices 102, computer device 108, I/O interface 106, feedback devices 112 and other integrated elements of the system 100. In the retrofit application, the present invention may be mounted on, in, or around the vehicle's steering wheel. It is designed to be installed by the purchaser. In the retrofit application, the present invention is designed to be removable by an authorized user if necessary. An adjustable harness may be provided which is designed to accommodate different steering wheel designs and sizes. It includes support and integration structures for the integrated sensor devices 102 and any number and/or combination of any features and elements of the described embodiments of the present invention.

A power source 150 may be provided, either integrated into the electronic system of the vehicle or as a stand-alone unit, and supplies the power required by of all of the described embodiments of the present invention. One such power source 150 for an embodiment of the present invention may be supplied by the vehicle electrical system and/or from a dedicated power source (e.g., a battery). In one embodiment of the invention, an alternative power interface 160 may be utilized from renewable energy sources which may supply the power requirements. The alternative power interface 160 is preferably configured according to one embodiment of the present invention or supply to the present invention may be obtained from renewable sources including but not limited to solar, wind, heat, static, recycled emissions, gyroscopic, mechanical, and magnetic energy.

As illustrated in FIG. 1, all connections of the main elements and sub-elements are made by conductive material in the form of conductive membranes, wires, integrated circuit components, via wirelessly or a combination thereof.

Systems configured according to alternative embodiments of the present invention may be configured to fit other steering or control mechanisms employed in any other vehicle or equipment. For instance, the steering wheel system 100 may be adapted to fit levers, handles, or any other controls. In these variations, the invention could be modified to detect proper position of one hand or both hands and/or the pressure applied. Similarly, other embodiments may incorporate additional driver state sensing mechanisms to monitor driver attention. These mechanisms include but are not limited to moisture sensors, heart rate indicators, or eye position sensing devices. In standard transmission vehicles and other non-automatic transmission vehicles, alternative embodiments may either allow for increased single hand position operation or allow for additional sensors deployed on transmission shifting controls.

One embodiment of the invention is activated when the vehicle is in motion. An illustrated embodiment is configured so that the hand position sensors 104 of the sensor devices 102 allow acceptable and unacceptable placement of the driver's hands. If activated hand sensors 104 are indicative of improper hand placement upon a steering wheel, the computer device 108 preferably triggers the feedback devices 112 to alert the driver of the unsafe hand position. The alert may be immediate and may escalate in intensity or number of devices activated. For instance, if only one hand sensor 104 is activated, the response of the feedback devices 112 is delayed for a pre-determined interval of time (e.g. three seconds) allowing the driver to activate a second hand sensor 104 within that interval.

If a second hand sensor 104 is not activated within the interval, the feedback devices 112 are triggered and may escalate in intensity and/or the number of devices activated. If no hand sensors 104 are activated, the computer device 108 may immediately trigger the feedback devices 112. The alert may escalate in intensity or number of devices triggered until two hand sensors 104 are activated. If two hand sensors 104 are activated, the computer 108 detects proper hand position and feedback devices 112 are not triggered.

Alternatively, it is to be appreciated if activated hand sensors 104 are indicative of proper hand placement upon a steering wheel, the computer device 108 preferably triggers the feedback devices 112 to provide indication or such proper and safe hand positioning. The indication may be immediate or provided after passage of a predetermined time period or event (e.g., vehicle operation has ceased).

The sensor device 102 activation and event data is preferably stored in the memory storage device 114 and can be downloaded or uploaded to external devices through the transmitting device 116 or other device where the data can be viewed and evaluated. One embodiment of the invention can be configured by the authorized system administrator to send real-time information to third parties (e.g. the vehicle operator and/or owner, parent, employer, the vehicle insurance company or another reporting entity).

In another illustrated embodiment, and as discussed below with reference to FIG. 2, transmitter device 116 is coupled to an insurance company server 124, which insurance company provides insurance for the vehicle having steering wheel mounting system 100 integrated therein and determines driver behavior from steering wheel hand placement.

Figure 2:
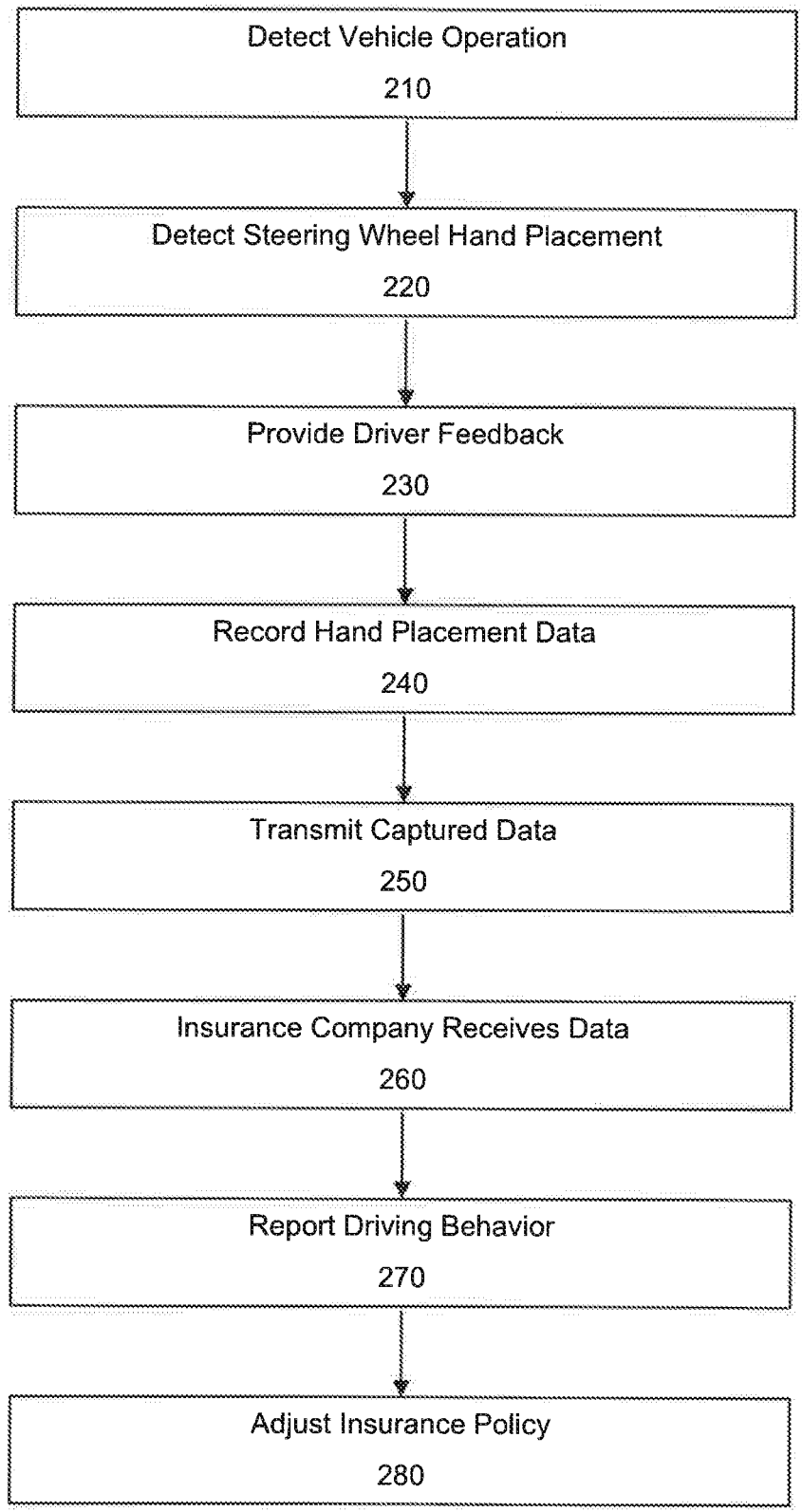
FIG. 2 is a flow chart illustrating a method of operation for the system of FIG. 1.

As illustrated in FIG. 2, a flowchart of the operation of a system configured according to an illustrated embodiment of the present invention is now described.

Starting at step 210, the computer device 108 waits for its accelerometer or motion sensor 110 or other data sources, such as vehicle telemetry for drive by wire vehicles to detect vehicle movement. Next, a determination is made regarding if proper hand placement is made upon the steering wheel, via hand position sensors 104 (e.g., are two hands applied at a proper distance apart) during vehicle movement, step 220. If during vehicle operation, improper hand placement is determined (e.g., no or only one hand is detected on the wheel for a predetermined amount of time and/or hands are improperly spaced apart from one another for a predetermined amount of time), warning feedback may be immediately provided to the driver via one or more of the feedback devices 112, step 230. Additionally, such determination of improper hand placement (step 220) may be recorded as data in memory storage device 114, step 240.

This stored data may then be transmitted from memory storage device 114, via transmitting device 116, to a computer server 124 associated with an insurance company responsible for providing vehicular insurance for a vehicle implementing the aforesaid steering wheel mounting system 100, step 250. A determination regarding driver behavior is then preferably computed by insurance computer server 124 via analysis of the aforesaid determined improper hand placement (step 220), step 260. If improper driving behavior is determined (e.g., improper hand placement), the insurance company may provide such notice to one or more of the determined vehicle operator, the legal custodian of the vehicle operator, the vehicle owner, a fleet manager of the vehicle, in addition to other interested third parties, step 270. It is also to be appreciated that alternatively if proper driving behavior is determined (e.g., proper hand placement), which behavior may exceed a threshold value (miles driven, times, etc.)), the insurance company may provide such notice to one or more of the determined vehicle operator, the legal custodian of the vehicle operator, the vehicle owner, a fleet manager of the vehicle, in addition to other interested third parties, step 270.

Additionally, if improper driving behavior is determined, and preferably based upon predetermined thresholds (e.g., repeated occurrences of determined improper driving behavior), the insurance company may adjust one or more parameters of the insurance policy covering the vehicle, including for instance: adjusting policy premiums, discounts, deductibles, coverage limits and policy duration, step 280. For instance, and in accordance with the aforementioned illustrative embodiments, the data detected from the sensor devices/system 102 regarding vehicle driver hand placement upon a vehicle steering wheel is provided to a computer server 124 (via transmitting device 116 and preferably a network). Upon receipt at computer server 124, the computer server 124 is configured to analysis the detected hand placement data to determine a driver score for the vehicle operator regarding detected hand placement (e.g., proper hand placement enhances a driver score while improper hand placement deters from the driver score). This determined driver score may then be associated with an insurance policy associated with the vehicle and/or vehicle driver, thus potentially affecting alterations to the insurance policy. It is noted, the insurance policy may be a preexisting one or may be a newly generated insurance policy. For example, a young driver who repeatedly drives poorly and is insured under a parent's insurance policy may cause increased premiums or other undesirable changes to the parent's insurance policy.

In accordance with another illustrated embodiment, steering wheel hand sensor 104 may include biometric functionality to provide driver safety detection features as described below.

An illustrated method of utilizing biometric steering wheel sensors includes collecting biometric data from a vehicle driver (via sensors 104) and collecting data regarding at least one operational characteristic of the vehicle (e.g., via a OBD type II device). The existence of one or more vehicular emergencies is then detected through analysis of at least a portion of the collected biometric data and the vehicle operational characteristic data. This method may also include communicating a message relating to the one or more vehicular emergencies, wherein the content of the message is determined by a processing device based at least in part on the analysis. This method may also include controlling at least one function of the vehicle in response to the analysis. The method may also include collecting data regarding at least one operational characteristic of at least one proximate vehicle and/or communicating and coordinating with at least one other vehicle.

Advantageously, principles of the invention provide enhanced techniques for detecting and managing vehicular emergencies based on analysis of data regarding both a vehicle and its operator. Features of the invention may provide for automatic overriding of manual control of a vehicle in situations where enhanced data analysis and more responsive driving is required.

For instance, if a driver becomes aware that an accident is imminent, biometric steering wheel sensors 102 detect, for example, an increased rate of both circulation and respiration, increased heartrate, and/or an intensified and/or sweatier grip on the steering wheel. Alternatively, if vehicle driver has fallen asleep or lost consciousness and is no longer able to control the vehicle, the steering wheel biometric sensors may be configured to detect a decreased heart and/or a weaker grip on the steering wheel.

Likewise, vehicular operational sensors may detect abnormal vehicle operation. For example, it may sense that a driver is overcompensating for a skid or that a tire has ruptured. In many such vehicular emergencies, drivers are incapable of reacting with sufficient speed and/or precision to avoid an accident. Since a computer system can process information and applications much faster than a human, such a system can control a vehicle more efficiently than a human in high-risk vehicular situations.

The aforesaid driver biometric data can then be combined with information preferably regarding the vehicle's position, speed, and acceleration to determine the danger level of a certain scenario. If a threshold is reached, the system can rapidly determine an action or route to take to avoid and minimize harm or damage. Accordingly, the combination of biometric steering wheel sensors 104 and vehicle operational sensors can permit more precise control in such situations. For instance, such information may be utilized for claims determination (e.g., where were, or weren't, the drivers' hands when the accident occurred?).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A vehicular steering wheel for determining operational characteristics of a vehicle, comprising:
    a sensor system disposed on a vehicular steering wheel configured to detect placement of a vehicle operators hands on the steering wheel;
    at least one biometric sensor disposed about a portion of the steering wheel for determining a health status of the vehicle operator;
    a component affixed to the vehicle configured to detect operational characteristics of the vehicle;
    a transceiver device configured to wirelessly send data from the vehicle to a remote computer device having a memory configured to store instructions and record data and a processor, wherein the processor upon execution of the instructions is configured to:
        receive data from the sensor system indicative of vehicle operator hand placement on the steering wheel;
        receive data from the biometric sensor regarding at least one biometric indicator of the vehicle operator;
        determine a value, based upon analysis of the data received from the sensor system indicative of vehicle operator hand placement on the steering wheel value, by determining a distance a drivers first and second hands are spaced from one another while positioned on the steering wheel that is indicative of proper hand placement upon the steering wheel;
        determine health status of the vehicle operator based upon the biometric data received from the sensor system disposed on the steering wheel; and
        prevent ignition of the vehicle based upon determined improper vehicle operator hand placement on the steering wheel.

2. The system as recited in claim 1 wherein the biometric indicator includes a detected heart rate of the vehicle operator.

3. The system as recited in claim 1, wherein the component affixed to the vehicle configured to detect vehicle operational characteristics is an On-Board Diagnostics (OBD) device.

4. The system as recited in claim 1, wherein the processor is further configured to send to a designated recipient the determined value indicative of proper hand placement upon the steering wheel by the vehicular operator.

5. The system as recited in claim 1 wherein the sensor system consists of a continuous sensor element disposed on a steering wheel circumference.

6. The system as recited in claim 1 further including at least one feedback device whereby a vehicle operator is alerted to an unsafe hand position on the steering wheel.

7. The system as recited in claim 1, wherein the processor is further configured to transmit notice of improper determined vehicle operator hand placement to a designated recipient.

8. The system as recited in claim 1, wherein the sensor system includes a sensor array having sensors selected from the group of sensors consisting of: magnetic sensors, field effect sensing sensors, optical sensors, mechanical sensor, capacitive sensors, infrared sensors, heat sensors, moisture sensors, pressure sensors, biometric sensors, and combinations of the same.

9. The system as recited in claim 1 further including at least one feedback device whereby a vehicle operator is alerted when improper steering wheel hand placement is determined.

10. The system as recited in claim 1, wherein the processor is further configured to receive data indicative of vehicle operational characteristics from the component affixed to the vehicle.

11. The system as recited in claim 10, wherein the processor is further configured to determine occurrence of an emergency incident based upon a combination of received data indicative of vehicle operational characteristics and the determined health status of the vehicle operator.

12. The system as recited in claim 11, wherein the processor is further configured to change an aspect of operation of the vehicle dependent occurrence of an emergency incident so as to change an operational condition of the vehicle.

13. The system as recited in claim 4 wherein the designated recipient is an insurance provider.

14. The system as recited in claim 7 wherein the designated recipient is an insurance provider.

* * * * *